3,019,262
N-BENZYL-N'-PHENYL-p-PHENYLENEDIAMINE AND ITS MANUFACTURE

Joseph C. Ambelang, Akron, Ohio, assignor to The Firestone Tire & Rubber Company, Akron, Ohio, a corporation of Ohio
No Drawing. Original application Jan. 9, 1956, Ser. No. 557,868. Divided and this application May 19, 1958, Ser. No. 735,996
1 Claim. (Cl. 260—570.9)

This invention relates to N-benzyl-N'-phenyl-p-phenylenediamine. It has value as an antiozonant for butadienestyrene synthetic rubber. The invention includes both the new product and its manufacture.

N-benzyl-N'-phenyl-p-phenylenediamine is made from p-aminodiphenylamine in two steps. In the first step, p-aminodiphenylamine is reacted with benzaldehyde to produce N-benzal-N'-phenyl-p-phenylenediamine. In the final step, N-benzal-N'-phenyl-p-phenylenediamine is reduced to N-benzyl-N'-phenyl-p-phenylenediamine.

In the first step, p-aminodiphenylamine is dissolved in any usual organic solvent, such as, for instance, acetic acid, benzene, toluene, an ester, as, for instance, ethyl acetate, etc. The benzaldehyde reacts with the amine in equimolecular proportions, preferably at room temperature. The reaction product is triturated in any non-solvent, usually water, separated and then recrystallized from any alcohol, any aliphatic hydrocarbon, etc.

The N-benzyl-N'-phenyl-p-phenylenediamine is preferably reduced with hydrogen while suspended or dissolved in an aliphatic solvent such as a hydrocarbon, an alcohol, etc., in the presence of a hydrogenation catalyst, such as finely divided nickel or cobalt on silica, or silica-aluminum support, Raney nickel or cobalt, copper chromite, platinum or palladium supported or unsupported, etc. Superatmospheric pressure is used for the hydrogenation. With platinum or palladium relatively low pressures, e.g., 25–500 pounds per square inch are generally used. With the other catalysts, such as the nickel and cobalt, higher pressures of 1000 pounds or more may be used. The progress of the hydrogenation is generally followed by observing the drop in pressure resulting from absorption of the hydrogen, and the reaction is stopped when two atoms of hydrogen have been used up for each molecule of N-benzal-N'-phenyl-p-phenylenediamine that is present. Instead of hydrogenating, the reduction may be effected by other reducing agents, as, for example, stannous chloride, zinc dust, etc. The reduced product is purified by recrystallization from any usual organic solvent, as, for example, benzene, toluene, an aliphatic alcohol, an aliphatic hydrocarbon, etc.

The following example illustrates the preparation of the new compound:

Crude p-aminodiphenylamine, 36.8 g. (0.2 mole), was ground with 30 ml. of 50 percent acetic acid, and the slurry shaken while 21.2 g. of benzaldehyde (0.2 mole) was dropped in. Reaction was almost instantaneous. The solid product, N-benzal-N'-phenyl-p-phenylenediamine, was triturated with water before filtration. The air-dried product was recrystallized from 600 ml. of heptane to give 19.0 g. of purified material.

N-benzal-N'-phenyl-p-phenylenediamine, 19 g. or 0.07 mole was suspended in 150 ml. of ethanol with 0.1 g. of Adams platinum oxide catalyst. This was shaken under 30 pounds per square inch of hydrogen in a Burgess-Parr apparatus for five hours, until the theoretical amount of hydrogen had been absorbed. After removal of the catalyst the solvent was distilled off on a steam bath. By stirring the residue with hexane, 18.2 g. of crystalline N-benzyl-N'-phenyl-p-phenylenediamine was obtained. After recrystallization from benzene-petroleum ether the product melted at 65–70° C. After a second recrystallization from benzene-hexane the product melted at 72–72.5° C.

This application is a division of my application Serial No. 557,868 filed January 9, 1956, now abandoned.

The invention is covered in the claim which follows.

What I claim is:

The process of producing N-benzyl-N'-phenyl-p-phenylenediamine, which comprises agitating at substantially room temperature N-benzal-N'-phenyl-p-phenylenediamine in an aliphatic solvent and treating the same during agitation with a substantially equimolecular amount of hydrogen with a hydrogenation catalyst of the class consisting of finely divided nickel, cobalt, copper chromite, platinum and palladium.

References Cited in the file of this patent

UNITED STATES PATENTS

| | | |
|---|---|---|
| 2,422,013 | Haury et al. | June 10, 1947 |
| 2,764,591 | Sprinzak | Sept. 25, 1956 |

FOREIGN PATENTS

| | | |
|---|---|---|
| 726,545 | Great Britain | Mar. 23, 1955 |
| 312,721 | Switzerland | Apr. 14, 1956 |

OTHER REFERENCES

Huecke: Justus Liebig's Annalen, vol. 255; pages 189–190 (1889).

Degering: "An Outline of Org. Nitrogen Comp." page 299, University Lithographers—Ypsilanti, Mich. (1945).

Sprinzak: Journal of the American Chemical Society, vol. 78, page 3208 (1956).